United States Patent
Lin et al.

(10) Patent No.: US 6,226,696 B1
(45) Date of Patent: May 1, 2001

(54) PROGRAMMABLE CIRCUIT FOR SENSING COMPUTER POINTING DEVICES TO SINK A DIFFERENT AMOUNT OF CURRENT DEPENDING ON THE REQUIREMENTS OF THE DEVICE

(75) Inventors: Feng-Chen Lin, Union City; Ni Sun, Sunnyvale, both of CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/182,995

(22) Filed: Oct. 29, 1998

(51) Int. Cl.[7] .................................................. G06F 13/10
(52) U.S. Cl. ............................. 710/8; 710/14; 345/161; 345/163
(58) Field of Search .................................. 710/8, 10–14; 345/161, 163, 164, 167

(56) References Cited

U.S. PATENT DOCUMENTS

| | | | |
|---|---|---|---|
| 4,727,514 | * | 2/1988 | Bhuva et al. .......................... 365/104 |
| 5,379,382 | * | 1/1995 | Work et al. ............................. 710/63 |
| 5,526,037 | | 6/1996 | Cortjens et al. ........................ 348/15 |
| 5,546,030 | * | 8/1996 | Cameron ............................... 327/110 |
| 5,550,528 | * | 8/1996 | Offord et al. ...................... 340/146.2 |
| 5,565,889 | | 10/1996 | Crooks et al. ........................ 345/157 |
| 6,033,441 | * | 3/2000 | Herbert ................................. 769/400 |

OTHER PUBLICATIONS

CY7C63100, CY7C63101 Universal Serial Bus conductor product information, Cypress Semiconductor Corporation, San Jose, CA 95134, Oct. 1996, rev. Nov. 1996.

* cited by examiner

*Primary Examiner*—Thomas Lee
*Assistant Examiner*—Thuan Du
(74) *Attorney, Agent, or Firm*—Townsend and Townsend and Crew LLP

(57) ABSTRACT

Method and circuitry for programmably sensing signals from computer pointing devices having different electrical specifications. Programmable current sink techniques allow the circuit to properly sense and interpret signals from a variety of computer pointing devices such as mouse and trackball rollers and joysticks.

17 Claims, 3 Drawing Sheets

PROGRAMMABLE CIRCUIT FOR SENSING COMPUTER POINTING DEVICES TO SINK A DIFFERENT AMOUNT OF CURRENT DEPENDING ON THE REQUIREMENTS OF THE DEVICE

BACKGROUND OF THE INVENTION

The present invention relates in general to integrated circuits, and in particular to a circuit that can be programmed to sense varying signals from different types of computer peripheral devices such as pointing devices.

The rapid expansion of the personal computer (PC) market has brought about a proliferation of PC peripheral devices. The range of these devices includes standard peripherals such as monitors, keyboards, modems, mouse and joystick devices, to CD ROM or DVD drives, and imaging devices such as printers and scanners, and to more advanced multi-media related devices such as high-fidelity audio and video products, data gloves and digitizers. In order to facilitate the interface between these wide ranging peripheral devices and the host PC, the members of the personal computer and telecommunications industry have developed a standard for a single, universal interface connector and protocol generally referred to as the Universal Serial Bus (USB). By defining a universal connector, the USB eliminates the need for different types of ports and jacks. It also eliminates the need to make provisions for installing different cards into dedicated PC slots and then reconfiguring the system in order to accommodate some of the enumerated peripheral devices. Further, interface between USB compliant PCs and peripheral devices is automatically configured upon physical connection.

While the USB has to a great extent standardized the interface protocol between the PC and the many different peripheral devices, there remains differences in the electrical specifications of the interface circuits. That is, while the same USB-defined set of signals may be involved in, for example, detecting a pointing device (e.g., mouse, joystick, trackball, gamepad, etc.), the circuits processing these signals may have differing electrical requirements. For example, the interface circuit for a mouse manufactured by one vendor may require an amount of sink current that is almost an order of magnitude smaller than one manufactured by another vendor. A similar incompatibility exists for different pointing devices manufactured by the same vendor. For example, the current sinking requirements for a joystick interface circuit differs substantially from those of a mouse roller. This results in manufacturers having to design different interface circuitry for the same USB compliant peripheral device, depending on the application and the vendor requirements.

There is therefore a need for a circuit that can accommodate differing interface electrical specifications for PC peripheral devices such as pointing devices as required by different manufacturers and different applications.

SUMMARY OF THE INVENTION

The present invention provides a programmable circuit capable of detecting pointing devices with varying interface electrical specifications. Broadly, the pointing device sensor of the present invention includes a programmable current sink circuit that is configured by a programming circuit. The programmable current sink circuit includes a plurality of individual programmable current sink blocks coupled to decode a corresponding plurality of roller input signals when configured in a roller mode of operation (e.g., mouse or trackball). Each programmable current sink block includes a plurality of switched current sink devices coupled to a comparator. A reference signal generator supplies a different reference signal to the comparators depending on whether the circuit is configured in a roller mode of operation or a joystick mode of operation.

Accordingly, in one embodiment, the present invention provides a programmable interface circuit for sensing computer pointing devices, wherein the interface circuit includes a programmable current sink circuit having a plurality of interface inputs coupled to receive signals from an external pointing device, and a programming circuit coupled to the current sink circuit by a control bus, wherein, control signals from the programming circuit configure the programmable current sink circuit to sink a different amount of current depending on the requirements of the external pointing device.

In a more specific embodiment of the programmable interface circuit of the present invention, the programmable current sink circuit includes a plurality of programmable current sink blocks each receiving a respective signal from the external pointing device, and a programmable reference signal generating circuit coupled to the plurality of current sink blocks, wherein the programmable reference signal generating circuit generates a first reference signal in a first mode of operation, and a second reference signal in a second mode of operation.

The following detailed description and the accompanying drawings provide a better understanding of the nature and advantages of the programmable interface circuit for sensing pointing devices according to the present invention.

DESCRIPTION OF THE SPECIFIC EMBODIMENTS

Figure 1:
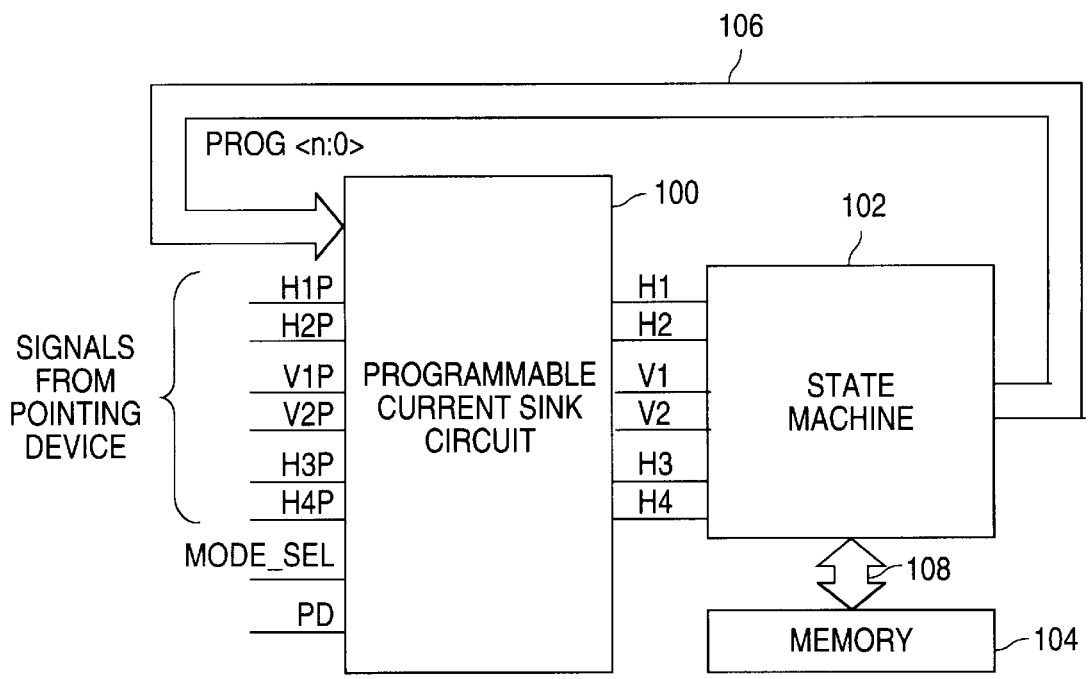
FIG. 1 is a simplified block diagram of the programmable interface circuit of the present invention.

Referring to FIG. 1, there is shown a simplified block diagram of the programmable interface circuit of the present invention. The circuit includes a programmable current sink circuit 100 that has a plurality of inputs for receiving signals from a pointing device. Pointing devices such as mice or trackballs, use a roller mechanism that operates based on three pairs of direction signals (up/down, left/right, and rotate). The plurality of inputs to programmable current sink circuit 100, therefore, include three pairs of inputs H1P/H2P, V1P/V2P, and H3P/H4P. Programmable current sink circuit 100 also receives a MODE_SEL input that selects a mode of operation depending on the type of pointing device the circuit is interfacing with. In one example, MODE_SEL selects between a roller type device and a joystick. When in joystick mode of operation, depending on the number of directions the joystick device supports, any where from one to three (or more) of the six roller input pins are used to receive signals from the joystick. Programmable current sink circuit 100 also receives a PD signal in response to which the circuit enters a power down or suspend (or idle) mode wherein the circuit is disabled to reduce power consumption.

The programmable interface circuit further includes a programming circuit (or controller) which, in this exemplary embodiment is implemented by a state machine 102. State machine 102 supplies programming data to programmable current sink circuit 100 via a control bus 106. The programming data from state machine 102 configures various programmable current sink blocks inside programmable current sink circuit 100 (shown in FIG. 2) to receive specific interface signal levels as required by a given pointing device. The programming data, therefore, differs depending on the type of pointing device the circuit is required to interface with. In a preferred embodiment, a memory circuit 104 stores the information corresponding to the various current requirements, and interfaces with state machine 102 via a bi-directional bus 108. Any type of volatile or non-volatile memory technology can be used to implement memory circuit 104. In a preferred embodiment, electrically erasable programmable read only memory (EEPROM) technology is used to store a, for example, 4-bit code that represents the desired current sink level programming data. The 4-bit code which varies depending on the current requirements of a particular vendor, is programmed in the EEPROM cells of memory circuit 104 before the pointing device is plugged in. State machine 102 receives at its inputs, data from memory circuit 104 and generates the programming data to be supplied to programmable current sink circuit 100 via control bus 106. State machine 102 then receives sensed pointing device signals supplied at the output of programmable current sink circuit 100. It is to be understood that the state machine implementation as shown in FIG. 1 is for illustrative purposes only, and that any type of microcontroller circuit can be used to program the circuit. A system within which the programmable interface circuit of the present invention can be advantageously implemented is a configurable USB node. An example of such a USB node is described in commonly-assigned U.S. patent application Ser. No. 09/040,110, now U.S. Pat. No. 6,044,428, for a "Configurable Universal Serial Bus Node," filed Mar. 17, 1998, which is hereby incorporated by reference in its entirety.

Figure 2:
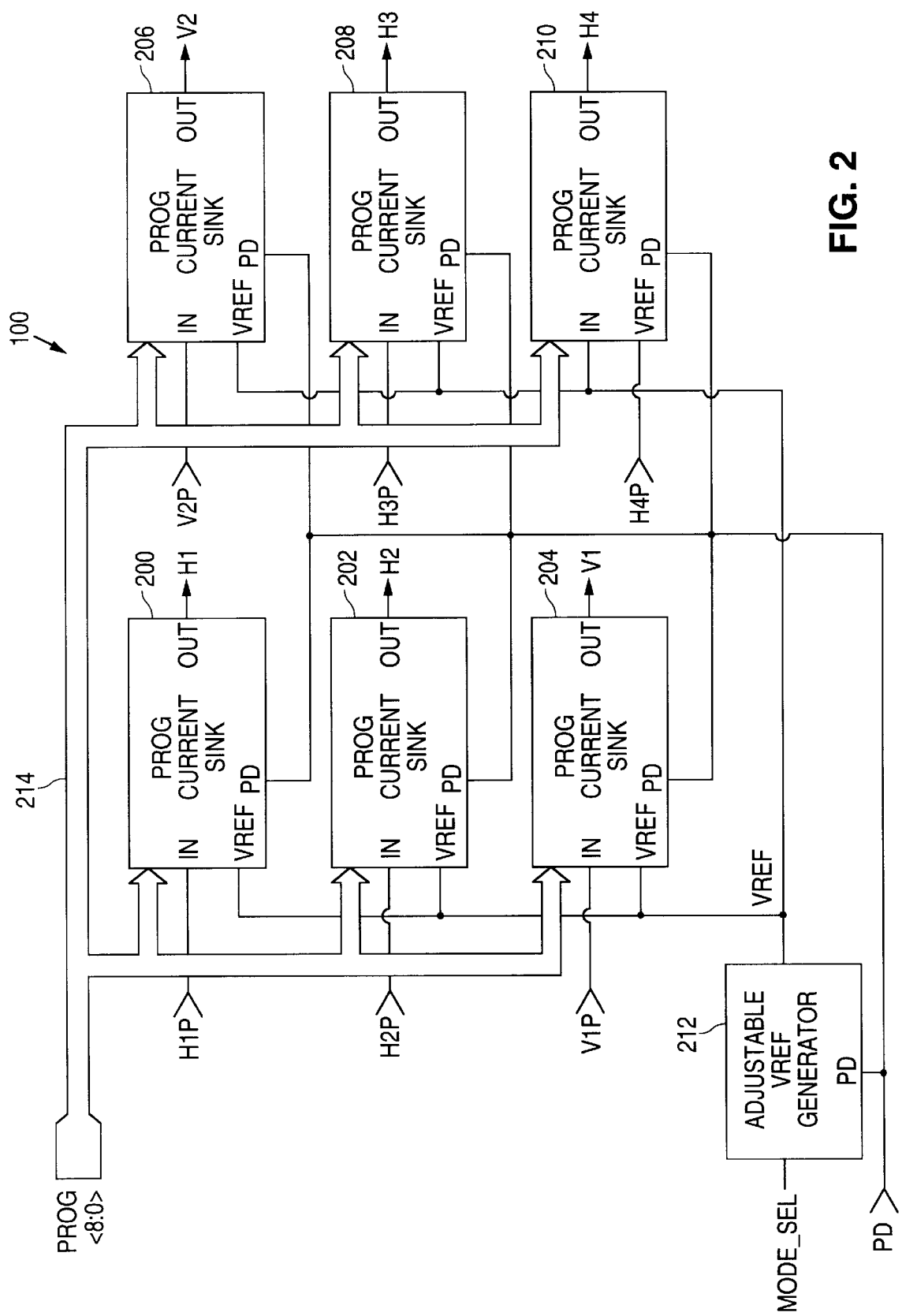
FIG. 2 is a block diagram of an exemplary programmable current sink circuit according to the present invention.

Details of the operation of the programmable interface circuit of the present invention will be described hereinafter in connection with a specific circuit example depicted in FIGS. 2, 3 and 4. In one embodiment, the technique of the present invention is utilized to sense signals from various types of mouse/trackball rollers and joysticks. Referring to FIG. 2, there is shown an exemplary block diagram for the programmable current sinking circuit 100 of FIG. 1. Three pairs of programmable current sink blocks 200/202, 204/206, and 208/210, each respectively receive the three pairs of roller direction signals H1P/H2P, V1P/V2P, and H3P/H4P as shown. An adjustable reference circuit 212 generates, in this embodiment, a reference voltage VREF that is supplied to each of the six programmable current sink blocks 200 through 210. A multi-bit (in this example 9 bit) control bus 214 supplies programming data PROG<8:0> to each of the six programmable current sink blocks. Programmable current sink blocks also receive a signal PD in response to which the circuit enters a power down or suspend mode of operation. Thus, the circuit provides a dedicated programmable current sink block for each roller signal. In the roller mode of operation (as determined by MODE_SEL), depending on a particular vendor specification, the current sink capability of each current sink block can be programmed to properly detect the input signals. This is accomplished by the state machine implementation wherein programming signal PROG<8:0>is supplied by state machine (102 in FIG. 1), configuring each current sink block to sink the desired magnitude of current.

The circuit is designed such that, in addition to roller type devices, it can detect signals from a joystick. Conventional joysticks use a potentiometer to detect angular motion as represented by a pair of signals. In the joystick mode of operation, for a three directional application, any three of the six roller inputs (e.g., H1, V1, and H3) are selected to facilitate the interface. The circuit enters joystick mode in response to the signal level on MODE_SEL. Adjustable reference circuit 212 receives the mode select signal MODE_SEL and generates a reference signal (in this case a reference voltage) that is suitable for detection of joystick signals. Programmability of current sink levels is available in the joystick mode of operation as well. The 9-bit programming signal PROG<8:0> can configure the various blocks to properly detect pointing signals from devices requiring current sink amounts ranging from e.g., 0.1 mA to 1 mA.

Figure 3:
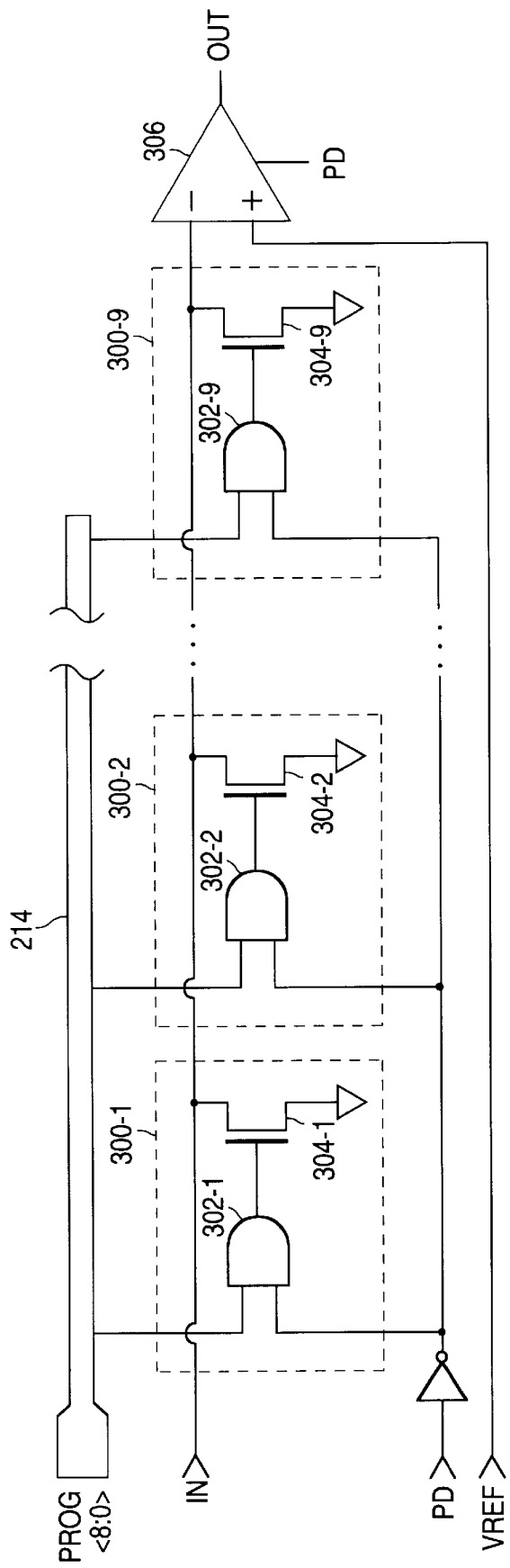
FIG. 3 is an exemplary 9-bit implementation of a programmable current sink block for use in the programmable current sink circuit.

FIG. 3 shows an exemplary circuit implementation for a 9-bit programmable current sink block used in the programmable current sink circuit of FIG. 2. The input from the pointing device IN is supplied to nine programmable current sink cells 300-1 to 300-9. Each programmable current sink cell 300 is made up of an AND gate 302 driving the gate terminal of a field effect transistor 304. Each AND gate 302 receives, at one input, a programming bit from the 9-bit control bus 214, and at the other input the PD signal. Each transistor 304 connects between the input IN and ground. The circuit further incudes an analog comparator 306 that receives at one input the signal on IN, and at another input the signal VREF. Analog comparator 306 also receives the PD signal to shut down its circuitry when the circuit enters power down or suspend mode.

In operation, each transistor 304 is biased in its linear mode of operation sinking a fixed amount of current I when turned on. When PD is low (i.e., circuit is in active mode), each AND gate 302 turns its associated transistor 304 on or off in response to a programming bit PROG<8:0> on bus 214. As the transistors are coupled in parallel, turning each one will increase the current sinking ability of the circuit by the fixed amount I. Thus, when all nine transistors 304-1 to 304-9 are turned on, the circuit sinks the largest amount of current. Setting the incremental value of I to, for example, 0.1 mA, the range of current the circuit can sink is 0.1 mA to 1.0 mA. This assumes a default current of 0.1 mA when none of the transistors 304 are turned on. Once the current sink amount is adjusted to the desired level (as governed by the vendor specification), the input signal can be properly detected. This is accomplished by comparator 306 that compares the signal on IN with the signal VREF. As described above, VREF is set to either the roller value in roller mode of operation, or the joystick value in joystick mode of operation. In roller mode, properly detected transitions on the three pairs of inputs are counted with the sequence providing a digital estimate of the location of the ball.

When in joystick mode, the user programs mode select resources to configure the circuit for joystick interface (e.g., potentiometer). An RC circuit changes the width of an internal digital pulse whose width is measured and reported back to the state machine. The state machine uses a different algorithm for interpreting the inputs to the chip depending on the selected mode of operation. In either the power down or the suspend mode, the signal on PD is high, making sure all AND gates 302-1 to 302-9 turn their associated transistors off, so that no current is dissipated by these transistors.

It is to be understood that the circuit of FIG. 3 shows an exemplary implementation for illustrative purposes only, and that implementational variations using the same technique are possible. For example, transistors 304-1 to 304-9 can be designed to have fixed but different current sinking ability. Binary weighting of the transistor sizes and their respective current sinking ability, for example, is one method of increasing the range of current the circuit can be programmed to sink.

Figure 4:
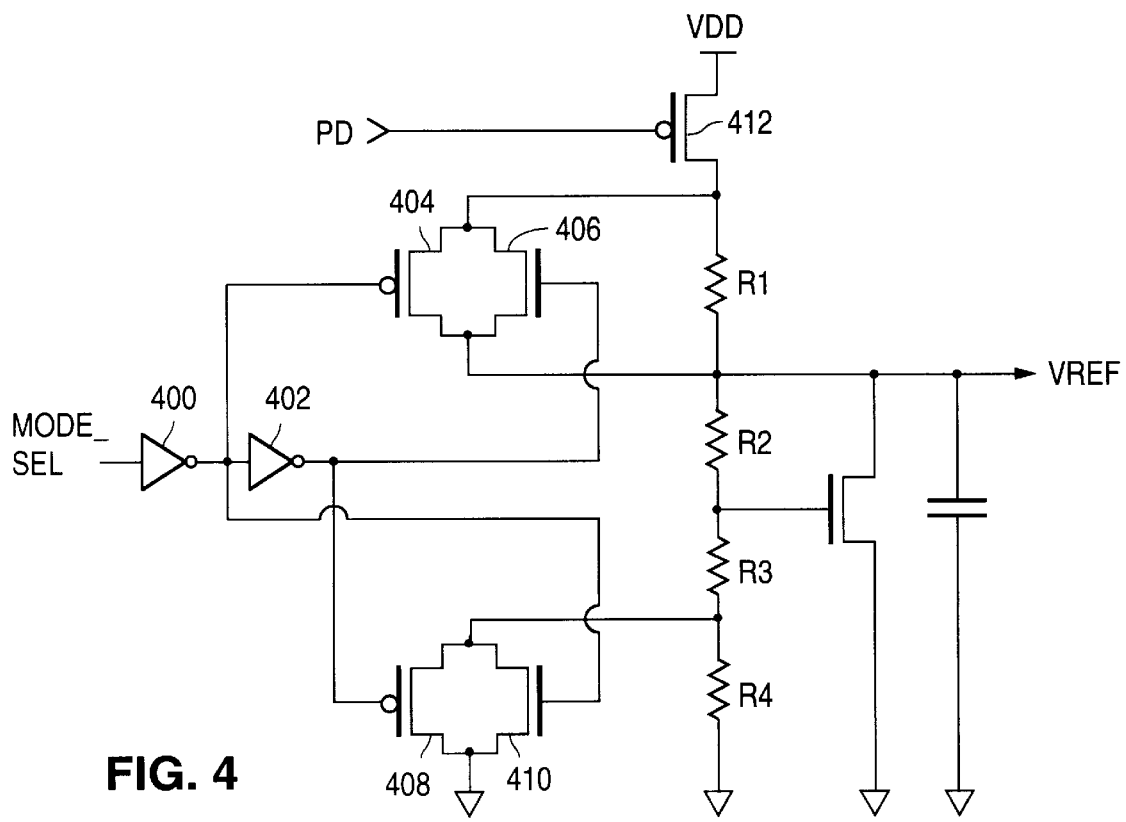
FIG. 4 is an exemplary circuit implementation of a programmable reference voltage generator.

FIG. 4 shows one example of how an adjustable reference circuit can be implemented for the purposes of the present invention. A resistive divider chain made up of resistors R1, R2, R3 and R4 serially connect between the power supply voltage VDD and ground. A p-channel transistor 412 connects VDD to R1, such that when turned off (PD=high), power is disconnected from the resistor chain. A pair of switches in the form of transmission gates connect across resistors R1 and R4. Each transmission gate is made up of an n-channel transistor coupled to a p-channel transistor. The gate terminals of the transistors in the switches are driven by the MODE_SEL signal and its complement. When MODE_SEL is high, transistors 404/406 are turned on and transistors 408/410 are turned off. This shorts out resistor RI and couples VREF to VDD via transistor 412. In the exemplary embodiment described herein, this mode corresponds to joystick mode of operation. When MODE_SEL is low, transistors 408 and 410 are turned on and 404 and 406 turned off. This yields a VREF value that is equal to approximately (VDD)×(R1/R2+R3) for roller mode of operation. The value of VREF in either mode can be easily adjusted by a selecting appropriate values for resistors R1, R2, R3 and R4.

In conclusion, the present invention provides a programmable circuit capable of detecting pointing devices with varying interface electrical specifications. A programmable current sink circuit combined with an adjustable reference signal generator enable the user to program the circuit of the present invention to receive and process signals from different pointing devices having different electrical requirements. While the above is a complete description of the preferred embodiment of the present invention, it is possible to use various alternatives, modifications and equivalents. For example, depending on the level of programmability desired, individual programmable current sink blocks may have either fewer or larger number of programmable current sink cells, with a corresponding change in the number of programming bits (i.e., width of control bus 214). Programmable circuits for sensing varying signals from pointing devices other than roller/trackball or joystick (e.g., gamepad, etc.) can also be implemented using the circuit techniques taught by the present invention. Therefore, the scope of the present invention should be determined not with reference to the above description but should, instead, be determined with reference to the appended claims, along with their full scope of equivalents.

What is claimed is:

1. A programmable circuit for sensing signals from a computer pointing device, the programmable circuit comprising:
    a programmable current sink circuit having a plurality of interface inputs coupled to receive signals from the pointing device; and
    a programming circuit coupled to the current sink circuit by a control bus, wherein control signals from the programming circuit configure the programmable current sink circuit to sink a different amount of current depending on the requirements of the external pointing device, and
    wherein, the programmable current sink circuit comprises a plurality of current sink transistors that are turned on or off in response to control signals and a comparator coupled to the transistors and adapted to compare a signal from the pointing device to an adjustable reference voltage.

2. The programmable circuit of claim 1 wherein the plurality of interface inputs of the programmable current sink circuit comprise inputs for receipt of signals from a roller type pointing device.

3. The programmable circuit of claim 2 wherein the plurality of interface inputs of the programmable current sink circuit comprise inputs for receipt of signals from a joystick.

4. The programmable circuit of claim 3 wherein the programmable current sink circuit further comprises a mode select input for receipt of a mode select signal selecting between a roller mode of operation and a joystick mode of operation.

5. The programmable circuit of claim 4 wherein the inputs for receipt of signals from a pointing device using a roller mechanism comprise first through sixth roller inputs coupled to receive three pairs of roller movement signals, respectively.

6. The programmable circuit of claim 5 wherein the programmable current sink circuit comprises first through sixth programmable current sink blocks coupled to respectively receive the first through sixth roller inputs, each programmable current sink block having a plurality of programming inputs coupled to the control bus.

7. The programmable circuit of claim 6 wherein the programmable current sink circuit further comprises an adjustable reference circuit configured to generate the adjustable reference voltage, said adjustable reference circuit having an input coupled to receive the mode select signal, and an output coupled to a mode select input of each of the programmable current sink blocks.

8. The programmable circuit of claim 7 wherein each programmable current sink block comprises:
    a plurality of programmable current sink cells each having a control input coupled to the control bus, and a current sink node coupled to a respective roller input; and
    a comparator having a first input coupled to the current sink node, and a second input coupled to the output of the adjustable reference circuit.

9. The programmable circuit of claim 8 wherein each of the plurality of programmable current sink cells comprises one of the plurality of current sink transistors having a first current-carrying terminal coupled to the current sink node, a second current-carrying terminal coupled to ground, and a control terminal coupled to the control input.

10. The programmable circuit of claim 9 wherein the current sink transistor in each programmable current sink cell is a field effect transistor operating in a linear mode of operation.

11. The programmable circuit of claim 10 wherein, in response to the mode select signal, the adjustable reference circuit generates a joystick reference signal in a joystick mode of operation, and a roller reference signal in a roller mode of operation.

12. The programmable circuit of claim 11 wherein each of the plurality of programmable current sink cells further comprises a logic circuit configured to perform an AND function between a control signal and a power down signal, and to drive a gate terminal of the field effect transistor.

13. The programmable circuit of claim 12 wherein in the roller mode of operation, roller signals are applied to the first through sixth inputs, and in the joystick operation joystick signals are applied to a selected sub-set of the first through sixth inputs.

14. A programmable circuit for sensing signals from a computer pointing device, the programmable circuit comprising:
   first through sixth programmable current sink blocks coupled to respectively receive, in a roller mode of operation, first through sixth roller signals from a pointing device having a roller mechanism;
   an adjustable reference circuit coupled to generate one of a plurality of reference signals in response to a mode select signal, the adjustable reference circuit further coupled to the first through sixth programmable current sink blocks; and
   a programming circuit coupled to the first through sixth programmable current sink blocks via a control bus, wherein the programming circuit configures each of the first through sixth programmable current sink blocks to sink a selected magnitude of current as required by the computer pointing device, and
   wherein the programmable current sink circuit comprises a plurality of current sink transistors that are turned on or off in response to control signals, and a comparator coupled to the transistors and adapted to compare a signal from the pointing device to an adjustable reference voltage.

15. The programmable circuit of claim 14 wherein, in a joystick mode of operation, a sub-set of the first through sixth programmable current sink blocks are configured to respectively receive first and second joystick signals, and wherein the adjustable reference circuit generates a joystick reference signal in response to the mode select signal.

16. The programmable circuit of claim 15 wherein each one of the first through sixth programmable current sink blocks comprises:
   a plurality of programmable current sink cells coupled in parallel and to the input of the programmable current sink block and the control bus; and
   a comparator configured to compare a signal on the input of the programmable current sink block with a reference signal generated by the adjustable reference circuit.

17. A method for sensing signals from one of a plurality of computer pointing devices, the method comprising the steps of:
   storing programming data representing current sink requirements of a selected pointing device, in a storage circuit;
   in response to the programming data, configuring a programmable current sink circuit to sink a desired magnitude of current in response to signals from the selected pointing device;
   generating an adjustable reference signal whose level varies depending on the requirements of the selected pointing device; and
   comparing the adjustable reference signal with a signal at an output of the programmable current sink circuit to detect and interpret the signals from the selected pointing device.

* * * * *